United States Patent
Knothe et al.

[15] 3,659,664
[45] May 2, 1972

[54] WEIGHING APPARATUS

[72] Inventors: Erich Emil Karl Knothe, Gottingen-Gismar; Eckhard Otto Walter Billin, Gottingen-Nikolausberg, both of Germany

[73] Assignee: Sartorius-Werke GmbH (und vormals Gottinger Prazisionswaagen GmbH), Gottingen, Germany

[22] Filed: June 8, 1971

[21] Appl. No.: 151,102

[30] Foreign Application Priority Data

June 16, 1970 Germany ............... P 20 29 735.2

[52] U.S. Cl. .................. 177/25, 177/3, 177/50, 177/210, 177/DIG. 3, 235/151.33
[51] Int. Cl. ............... G06f 15/20, G01g 23/37, G01g 23/42
[58] Field of Search ........... 235/151.33; 177/3, 25, DIG. 1, 177/DIG. 3, 210, 21.1, 50, 1

[56] References Cited

UNITED STATES PATENTS

| | | | |
|---|---|---|---|
| 2,065,960 | 12/1936 | Bauml | 177/DIG. 3 |
| 2,376,234 | 5/1945 | De Castro | 177/DIG. 1 |
| 2,632,058 | 3/1953 | Gray | 177/DIG. 1 |
| 2,975,409 | 3/1961 | Petherick | 177/DIG. 1 |
| 3,061,026 | 10/1962 | Hecox et al. | 177/DIG. 3 |
| 3,130,802 | 4/1964 | Bell | 177/12 |
| 3,203,495 | 8/1965 | Lindberg et al. | 177/DIG. 3 |
| 3,289,777 | 12/1966 | Willyard | 177/3 |
| 3,329,807 | 7/1967 | Currie et al. | 177/3 X |
| 3,439,760 | 4/1969 | Allen | 177/3 |
| 3,557,353 | 1/1917 | Allen | 177/3 X |

FOREIGN PATENTS OR APPLICATIONS

| | | | |
|---|---|---|---|
| 1,231,229 | 4/1960 | France | 177/DIG. 3 |
| 972,875 | 10/1964 | Great Britain | 177/DIG. 3 |
| 696,964 | 10/1965 | Italy | 177/3 |

*Primary Examiner*—Robert S. Ward, Jr.
*Attorney*—John Lezdey, Robert Osann, Jack J. Kramer, Julius Balogh and George F. Dvorak

[57] ABSTRACT

A weighing apparatus has a scale with code tracks which can be read by reading means. The scale is a tolerance scale and gives the possibility of achieving a predetermined or a selectable percentage accuracy of the tolerance part values which are covered by one code each. This is achieved by giving the codes in different ranges of the tolerance scale different lengths. The weighing apparatus may have several tolerance scales with different tolerance part values, the tolerance scales being centered at different weights, e.g., 5 or 10 or 20 g. In order to weigh a load with a certain desired percentage accuracy, the weighing apparatus is brought, f.i. by an additional load, to the range of the selected tolerance scale.

11 Claims, 10 Drawing Figures

Inventors:
ERIK EMIL KARL KNOTHE +
ECKHARD OTTO WALTER BILLIN

John Legolly
ATTORNEY

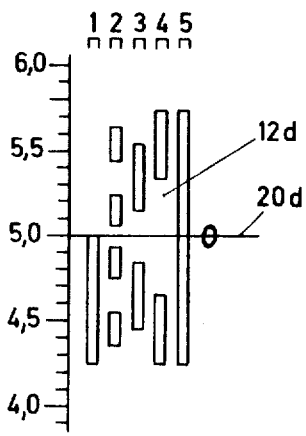

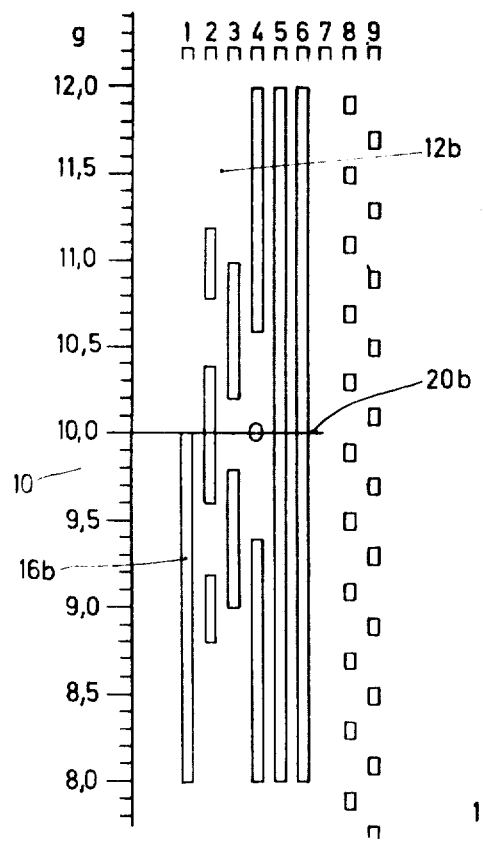
Fig. 5b  TTW=0,2g
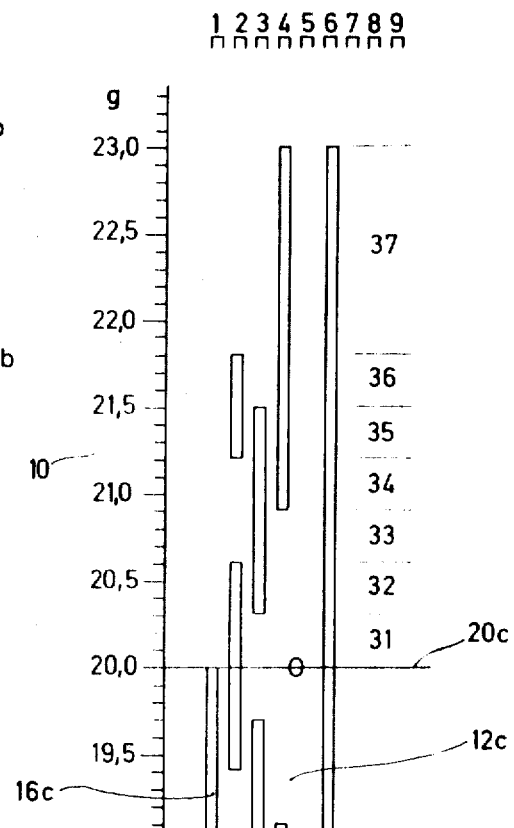
Fig. 5c  TTW=0,3g
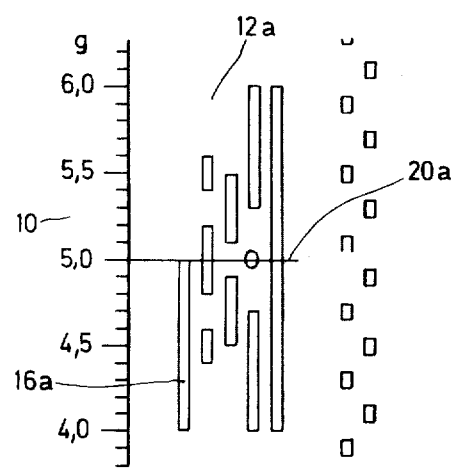
Fig. 5a  TTW=0,1g

WEIGHING APPARATUS

BACKGROUND OF INVENTION

1. Field to Which Invention Relates

The present invention relates to weighing apparatus, and more particularly to such apparatus comprising a scale which has code tracks in accordance with several bits, and with several associated reading means.

2. The Prior Art

Such weighing apparatus is for example described in the U.S. Pat. No. 3,289,777. The coding of the scale corresponds with the weight values. If the scale is for example subdivided into tenths of a gram, for each successive tenth of a gram a particular code is provided on the scale.

In the case of metering it is often sufficient to know whether the weight of a material lies within a preset tolerance, so that accordingly filling stations can be controlled or pieces which are of an excess weight or too low in weight can be sorted out or can be classified in accordance with the departures in weight.

SUMMARY OF INVENTION

The present invention consists in a weighing apparatus comprising a scale, code tracks on the scale in accordance with several bits, and associated reading means, the coded scale being a tolerance scale and for obtaining a certain or selectable percentage accuracy the tolerance part values covered by each respective code, of the scale are of different lengths in different tolerance ranges.

Such a coded tolerance scale can either be used alone or can be used additionally to a weight scale coded in a normal manner.

In the present description and claims the following technical terms, which have not yet been accepted as being standard are used:

Tolerance range: The extent of a tolerance scale extending from one end weight to the other end weight.

Tolerance part: The tolerance range is subdivided up into a number of tolerance parts with the same size or with different sizes.

Tolerance part value: The weight value of a tolerance part, that is to say the weight difference corresponding to the tolerance part.

Thus a tolerance scale can have various tolerance ranges, whose tolerance parts correspond to a tolerance part value of 0.1 g. or 0.2 g., etc.

The invention provides the principle that the tolerance part values have different lengths in different tolerance ranges. With this feature it is for example possible to ensure approximately that in all tolerance ranges tolerance weighing operations can be carried out with approximately the same percentage accuracy. It is possible for example to provide the smallest tolerance part values for the smallest weights and for increasingly large weights to provide increasingly large tolerance part values.

With this principle it is possible to ensure that the resolution within the whole scale differs substantially less than in the case of a division of the coding which remains constant. This offers an advantage as regards simplification of the electronic parts. In particular it is possible to use less bits and thus less reading parts and associated circuitry than if the whole scale were to be provided with the finest necessary code division from the start to the end.

For other applications a further development of the invention is intended to provide the possibility of being able to select arbitarily independently of the weight of the material to be weighed the percentage accuracy of the tolerance weighing operations. Thus, it is possible to weigh fine grained material with a substantially smaller tolerance than material in large lumps, and therefore the user of the weighing apparatus is to be given the possibility of selecting the percentage accuracy, that is to say the size of the tolerance part values, in accordance with the type of material to be weighed. This is achieved by adopting the feature that the weighing apparatus comprises several tolerance scales with different tolerance ranges, the tolerance part values within each tolerance scale being of the same size but being of different size in different tolerance scales, and the zero point of each tolerance scale (that is to say each tolerance range) coincides with a weight value of the weight scale different from zero, and the weighing apparatus is adapted to be set, independently from the size of the load, by selectable additional loads on the zero mark of a randomly selected tolerance scale.

Therefore, along the weight scale of the weighing apparatus several tolerance scales are provided with different tolerance ranges. Within each tolerance range the tolerance part values have a certain magnitude. In other tolerance scales the part values have a different magnitude. By the use of additional loads the user can ensure that for his weighing operations any desired tolerance scale of the tolerance scales present is used. As additional loads weight pieces or the spring of a tare setting device can be used.

In accordance with a further advantageous feature of the invention there is the provision that on the weighing apparatus at least one group of contacts which can be arbitrarily closed, is provided, whose number per group is equal to the number of the reading means, and a coincidence circuit is provided which only provides an output signal when a code read out by the reading means is the same as a code set on the contacts of one group.

In this manner on the weighing apparatus every desired tolerance limit can be set. This can be carried out manually, by plug-in contacts, push buttons, or by other means, for example via relays or cross bar distributors. If several tolerance ranges are set, classifying operations can be carried out with the weighing apparatus. In this respect the number of deviations within several tolerance limits can be determined. In this manner filling up and topping devices can be controlled.

LIST OF SEVERAL VIEWS OF DRAWINGS

Embodiments of the invention are described in what follows with reference to the accompanying drawings.

FIGS. 3 and 4 show examples for the setting of two and eight contact groups respectively.

FIGS. 5a to 5c show parts of another embodiment of a scale.

Figure 6:
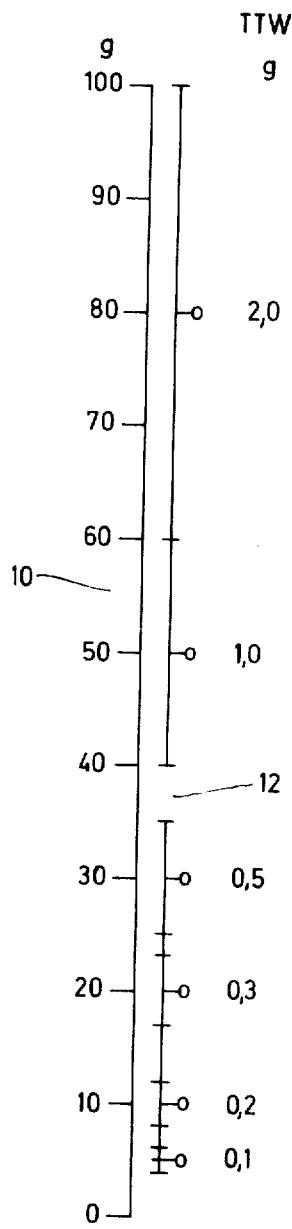
Figure 7:
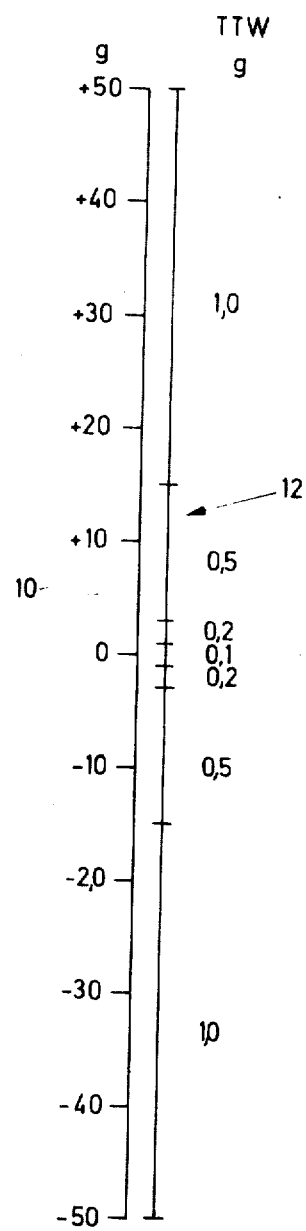

FIGS. 6 and 7 provide a comparison of the complete scale in accordance with the two embodiments of the invention.

FIGS. 8 shows a further embodiment in accordance with the scale part in accordance with FIG. 5a.

DESCRIPTION OF PREFERRED EMBODIMENTS

Figure 1:
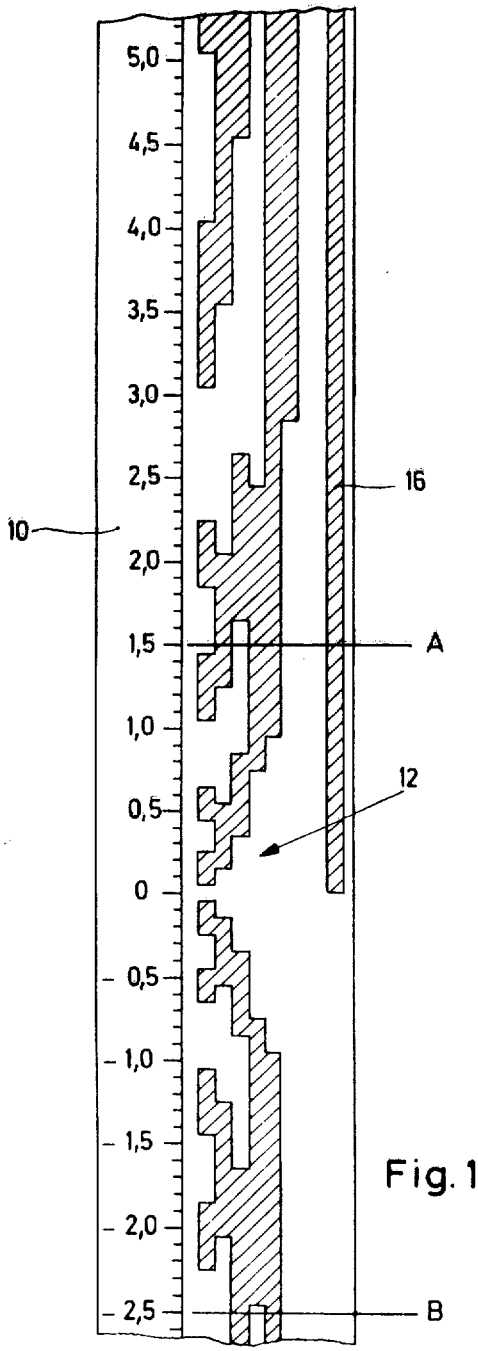
FIGS. 1 and 2 show parts of a tolerance scale coded in accordance with the invention, with an associated weight scale.
Figure 2:
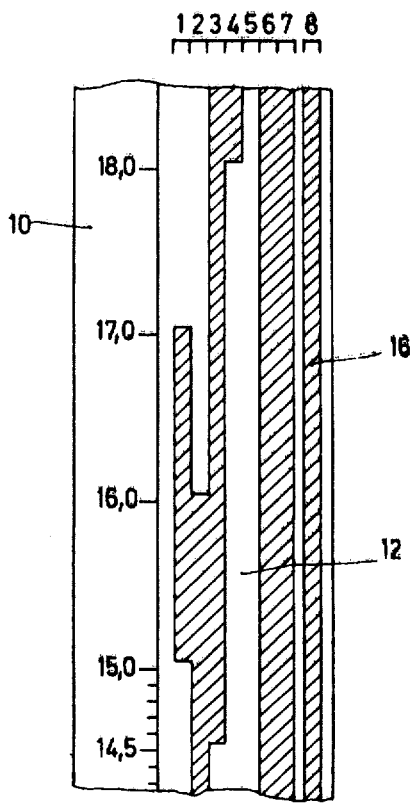

FIGS. 1 and 2 show parts of the scale of a weighing apparatus, for example a microscale, which is read or sensed with the help of a projection system. On the left a weight scale 10 which can be read normally is provided and can be projected on a ground glass screen. This scale can also be dispensed with if it is not desired to provide a visible indication. However, in the present case it serves for explaining the coded tolerance scale 12. The weight scale 10 has scale values (that is to say weight differences of the scale parts) of 0.1 g.

The tolerance scale 12 has seven code tracks which at the top are denoted in FIG. 1 with reference numerals 1 to 7 and cooperates with seven photoelectric transducers 14, which are denoted at the top in FIG. 1. The light coming through the scale is projected in a conventional manner by a projection device onto the photoelectric transducers. These transducers can be photocells, photoresistors or phototransistors.

In the case of the embodiment in accordance with FIGS. 1 and 2 the tolerance range of the coded scale 12 extends over the whole scale range of the weight scale 10. It does not, however, begin at the weight value zero but begins somewhat to the sides of this value, in the present case at ± 0.5 g. The tolerance scale 12 has the following tolerance part values:

| Tolerance scale range | | Tolerance part values |
|---|---|---|
| from g | to g | g |
| 0 ± 1 | | 0.1 |
| ± 1 | ± 3 | 0.2 |
| ± 3 | ± 15 | 0.5 |
| ± 15 | ± 50 | 1 |

Other or further tolerance part values can be provided. As is shown by FIGS. 1 and 2 the codes of the tolerance scale 12 have respective tolerance part values of the sizes given in the longitudinal direction. The tolerance parts begin and end in each case in the middle between two division marks of the scale 10.

On the right-hand side of the scale a code track 8 with an associated eighth photoelectric transducer 18 is provided for positive or negative weight values. The associated code has an opaque strip 16 above zero while the scale plate below zero is transparent at this position.

Before the start of tolerance weighing operations the weighing apparatus is set for the intended load by a zero-izing and/or tare setting device at zero. All departures from the intended weight then cause positive or negative displacements of the scale.

FIG. 3 shows an arrangement of two groups each with eight contacts which can be set by hand or by other means. The arrangement of the contacts corresponds with the position of the code tracks 1 to 8 in FIG. 1 and the position of the associated photoelectric transducers 14 and 18.

If x denotes the closed contacts, then in the row denoted by A in FIG. 3 a tolerance limit of +1.5 g. is set, as can be seen from a comparison with the code in FIG. 1 at line A. The fact that the last contact of the row is closed means a positive value.

Accordingly in the group B lying below a value of −2.5 g. is set (see line B in FIG. 1).

An arrangement in accordance with FIG. 3 is sufficient if the weighing apparatus is only intended to cover two tolerance limits. For a classification operation, on the other hand, more tolerance limits are necessary. FIG. 4 shows an arrangement with eight contact groups, which are set at the weight values given on the left.

The weighing apparatus comprises a conventional coincidence circuit which ensures that the weighing apparatus gives an output signal which ensures that the weighting apparatus gives an output signal when the photoelectric transducers 4 and 8 have read a weight value on the scale 12 which agrees with one of the weight values which are set on the contact group in accordance with FIG. 3 or FIG. 4. In accordance with the output signals indications of any desired type can then be provided, data can be fed to a computer or devices of various types can be controlled, for example classifying devices or counters.

FIG. 4 shows a practical use for statistical work or classification. The two middle contact groups are set to an assumed standard deviation of ± 0.3 g. The contact groups adjacent on either side are set to twice and three times the standard deviation respectively. The outer contact groups are set to six times the standard deviation so that stray values can be covered.

In order to ensure that spurious indications do not occur, in a known manner security devices can be provided which prevent the giving of any signals as soon as any part of the circuit, for example a photoelectric transducer, becomes faulty or ceases to function. Furthermore, the setting parts for the contacts in accordance with FIGS. 3 and 4 can be capable of being locked so that tolerance limits which have once been set correctly cannot be changed in error.

FIGS. 5a to 5c show parts of a scale in accordance with a different embodiment. On the left there is in each case the weight scale 10 and on the right adjacent to it there is a limited coded scale 12a to 12c. There are in all nine code tracks 1 to 9 (indicated at the top in FIGS. 5b and 5c). The middle of each of the tolerance scales is coordinated to a certain value of the weight scale 10. The middle of the tolerance scale 12a corresponds to the weight value 5.0 g., the middle of the tolerance scale 12b to the weight value 10.0 g. and the middle of the tolerance scale 12c to the weight value 20.0 g. Further tolerance scales are not shown but can be provided.

In the code track 1 there is an indication as to whether it is a question of a positive or a negative tolerance. For this purpose in each case a strip 16a to 16c is only provided below the tolerance zero marked 20a to 20c.

The code tracks 2 to 4 contain codes which indicate the tolerance part values. The tolerance part values have in FIG. 5a a weight difference of 0.1 g., in FIG. 5b a difference of 0.2 g., and in FIG. 5c a difference of 0.3 g. In FIG. 5c above the tolerance zero mark 20c the first six tolerance part values are indicated as 31 to 36. It can be seen that each of the tolerance part values 31 to 36 in the code tracks 2 to 4 has a code differing from the others corresponding to it. The range 37 above includes four tolerance part values, which have a common code associated with them. The percentage accuracy thus decreases suddenly by one quarter on passing over from range 36 to range 37. This sudden change in accuracy corresponds with practical requirements. The tolerance part values 31 to 36 are so chosen that all tolerances normally occurring occur on the part values 31 to 36 while the stray values come in the range 37.

There is the achievement that the range of 10 tolerance part values can be covered with only three code tracks, while in the case of even subdivision four code tracks would be necessary.

The code tracks 5 to 7 serve for indicating the tolerance range, that is to say they indicate whether in the range of a tolerance scale in accordance with FIGS. 5a, 5b, 5c, or a further tolerance scale not shown reading is carried out.

The code tracks 8 and 9 serve in a conventional manner to check that the resting position has been reached so as to ensure that it is not possible for the code tracks 1 to 8 to be read before the scale comes to rest. The code tracks 8 and 9 are, as is the case with all other code tracks, provided with photoelectric transducers, which are connected with a conventional circuit. A very similar circuit is described in the U.S. Pat. No. 3,130,802.

FIG. 6 shows the complete scale, of which FIGS. 5a to 5c only show sections. As can be seen in addition to the tolerance scales already described further tolerance scales are provided for the weight values 30, 50, and 80 g. as a zero mark. On the right adjacent to the scales in a column "TTW" the size of the tolerance part values of each of the tolerance scales is given and this indication always relates to the tolerance part values in accordance with the reference numerals 31 to 36 in FIG. 5c.

If for example a material is to be weighed or classified with a close tolerance, the weighing apparatus is set at the zero marks 5 or 10 g. of the weight scale, where the tolerance ranges have the small tolerance part values of 0.1 or 0.2 g. If larger tolerances are permissible, the weighing apparatus can be set at the zero marks at 50 or 80 g., in whose associated tolerance range the tolerance part values in the example amount to 1 and 2 g. respectively. The different tolerance ranges and part values of the embodiment should cover practical requirements. For other purposes it is, however, possible for other subdivisions to be provided.

The setting to the desired zero marks can be carried out partly by a zero setting device in the ray path of the projection device, while for a larger range use can be made of a tare setting device. With a tare setting device it is, however, generally only possible to increase the weight and not to decrease it. However, this should also be possible so that a user can for example weigh loads of 100 g. with an accuracy of 0.5 percent. For this purpose he must subtract 70 g. from the weight of the material to be weighed and set the weighing apparatus at the zero position at 30 g. of the weight scale. this could be carried out in the case of the use of weight pieces easily by raising weight pieces in the case of a substitution weighing apparatus or in the case of a weighing apparatus with two weighing pans by placing weight pieces on the weight pan. With a tare setting device it is, however, also possible to achieve a reduction of the additional weights if the spring of this device is pretensioned at the weight value of zero so that the spring can be unloaded for example by 100 g. The pretension is in accordance with the scale range, or more precisely stated in accordance with the maximum displacement possibility, that is to say from the middle of the tolerance scale with the smallest tolerance part values to the middle of the tolerance scale with the highest tolerance part values.

In FIG. 7 is set opposite to the scale of FIG. 6 a complete scale, of which FIGS. 1 and 2 show parts. On the right adjacent to the weight scale 10 the tolerance scale 12 is indicated diagrammatically. The tolerance scale 12 extends along the whole scale range. The zones of different tolerance part values are kept separate. The associated tolerance part values of 0.1 to 1.0 g. are indicated.

In the case of the scale in accordance with FIGS. 5a to 5c even a very slight deviation from the tolerance zero mark falls in the first tolerance part value (for example 31 in FIG. 5c) and it necessarily follows that a positive or negative tolerance is read. In order to ensure that this does not occur, a tolerance scale in accordance with FIG. 5a can be constructed in accordance with FIG. 8. In this case on either sides of the tolerance zero mark 20d in the tolerance code tracks 2 to 4 a space free of code can be provided which has the length of ± half a tolerance part value. The same applies accordingly for the scale in accordance with FIG. 1.

We claim:

1. In a weighing apparatus comprising a scale, code tracks on the scale in accordance with several bits, and associated reading means, the invention which resides in that the coded scale is a tolerance scale and for obtaining a certain or selectable percentage accuracy the tolerance part values covered by each respective code, of the scale are of different lengths in different tolerance ranges.

2. The structure in accordance with claim 1 in which tolerance part values covered by one code each have a minimum length at a position adjacent to the zero mark of the weight scale and in tolerance ranges adjacent on either side have greater and greater lengths.

3. The structure in accordance with claim 1, comprising several tolerance scales with different tolerance ranges, the tolerance part values within each tolerance scale being of the same size but being of different size in different tolerance scales, and the zero point of each tolerance scale (that is to say each tolerance range) coincides with a weight value of the weight scale different from zero, and the weighing apparatus is adapted to be set, independently from the size of the load, by selectable additional loads on the zero mark of a randomly selected tolerance scale.

4. The structure in accordance with claim 3 in which each tolerance range adjacent to a zero mark has a few tolerance part values of the same size corresponding to different codes, and adjacent to this has a range, which includes several tolerance part values corresponding to a single code.

5. The structure in accordance with claim 3 in which the additional loads are weights.

6. The structure in accordance with claim 5 in which the additional loads are switching weights.

7. The structure in accordance with claim 3, comprising at least one spring of adjustable length serving as additional loads.

8. The structure in accordance with claim 6 with a tare setting device, the spring working as additional load being that of the tare setting device.

9. The structure in accordance with claim 6 in which the spring is pretensioned at a weight value of zero.

10. The structure in accordance with claim 1 in which the tolerance part values of the coded tolerance ranges have such magnitudes in relation to the associated values of the weight scale that in all tolerance ranges there is approximately the same percentage accuracy.

11. The structure in accordance with claim 1 in which on the weighing apparatus at least one group of contacts which can be arbitarily closed, is provided, whose number per group is equal to the number of the reading means, and a coincidence circuit is provided which only provides an output signal when a code read out by the reading means is the same as a code set on the contacts of one group.

* * * * *